(12) United States Patent
Pietsch et al.

(10) Patent No.: US 6,604,592 B2
(45) Date of Patent: *Aug. 12, 2003

(54) METHOD AND DEVICE FOR ASSISTING A DRIVER DURING REVERSE TRAVEL

(75) Inventors: Frank Pietsch, Ronnenberg (DE); Detlev Neuhaus, Hannover (DE)

(73) Assignee: Wabco GmbH, Hannover (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,814

(22) Filed: Jul. 2, 1999

(65) Prior Publication Data

US 2002/0017412 A1 Feb. 14, 2002

(30) Foreign Application Priority Data

Jul. 11, 1998 (DE) .......................... 198 31 262

(51) Int. Cl.[7] .............................................. B60K 31/00
(52) U.S. Cl. ........................ 180/168; 180/169; 180/170
(58) Field of Search ................................. 180/167, 168, 180/169, 170

(56) References Cited

U.S. PATENT DOCUMENTS

| | | | | |
|---|---|---|---|---|
| 3,898,652 A | * | 8/1975 | Rashid | 342/59 |
| 4,574,908 A | * | 3/1986 | Brick | 180/169 |
| 4,803,488 A | * | 2/1989 | Dombrowski | 340/904 |
| 4,825,211 A | * | 4/1989 | Park | 340/901 |
| 4,833,469 A | * | 5/1989 | David | 340/901 |
| 4,864,298 A | * | 9/1989 | Dombrowski | 340/904 |
| 4,934,477 A | * | 6/1990 | Dai | 180/271 |
| 5,173,859 A | * | 12/1992 | Deering | 701/70 |
| 5,177,462 A | * | 1/1993 | Kajiwara | 340/435 |
| 5,251,680 A | * | 10/1993 | Minezawa et al. | 180/169 |
| 5,314,037 A | * | 5/1994 | Shaw et al. | 180/169 |

(List continued on next page.)

FOREIGN PATENT DOCUMENTS

| | | |
|---|---|---|
| DE | 3121684 | 12/1982 |
| DE | 4404527 | 8/1995 |
| DE | 19607788 | 9/1997 |
| EP | 0602353 | 10/1993 |
| JP | 58218295 | 12/1983 |

*Primary Examiner*—Brian L. Johnson
*Assistant Examiner*—Bridget Avery
(74) *Attorney, Agent, or Firm*—Proskauer Rose LLP

(57) ABSTRACT

A method and device prevents damage to a vehicle approaching an obstacle, such as, for example, a loading ramp, while traveling in reverse. When a vehicle, particularly a vehicle train consisting of a towing vehicle and a trailer or semi-trailer, approaches an obstacle in reverse travel, there exists the possibility that the vehicle may impact the obstacle as a result of an erroneous estimation or inappropriate driving maneuver, potentially resulting in damage to the vehicle and/or to the obstacle. This problem occurs with relative frequency, particularly when approaching a loading ramp. In accordance with the invention, the driver of the vehicle is assisted during reverse travel such that damage due to excessive impact is automatically avoided, independently of the driver's actions. A distance sensor is installed on the vehicle, near the tail, which transmits a signal representative of the distance from an obstacle to an electronic control device. The electronic control device evaluates the distance value measured by the distance sensor and adapts the speed of the vehicle during reverse travel in accordance with a predetermined algorithm in such manner that the approach to the obstacle takes place without damage to the vehicle and/or the obstacle. The control device advantageously influences the braking system of the vehicle and, if necessary, the drive engine, in a suitable manner.

41 Claims, 2 Drawing Sheets

U.S. PATENT DOCUMENTS

| | | | | |
|---|---|---|---|---|
| 5,357,438 A | * 10/1994 | Davidian | .................... | 701/301 |
| 5,419,621 A | 5/1995 | Horst | .......................... | 303/15 |
| 5,448,479 A | * 9/1995 | Kemner et al. | ............... | 701/23 |
| 5,451,820 A | * 9/1995 | Gotoh et al. | ............... | 307/10.6 |
| 5,461,357 A | * 10/1995 | Yoshioka et al. | ........... | 340/435 |
| 5,572,484 A | * 11/1996 | Gaus et al. | .................... | 367/99 |
| 5,574,426 A | * 11/1996 | Shisgal et al. | .............. | 340/435 |
| 5,574,644 A | * 11/1996 | Butsuen et al. | ............... | 701/93 |
| 5,635,922 A | * 6/1997 | Cho et al. | .................... | 340/903 |
| 5,646,612 A | * 7/1997 | Byon | ......................... | 340/903 |
| 5,864,285 A | 1/1999 | Wieder et al. | .............. | 340/435 |
| 5,869,764 A | * 2/1999 | Schulte | ........................ | 73/620 |
| 6,072,391 A | * 6/2000 | Suzuki et al. | ............... | 340/468 |

* cited by examiner

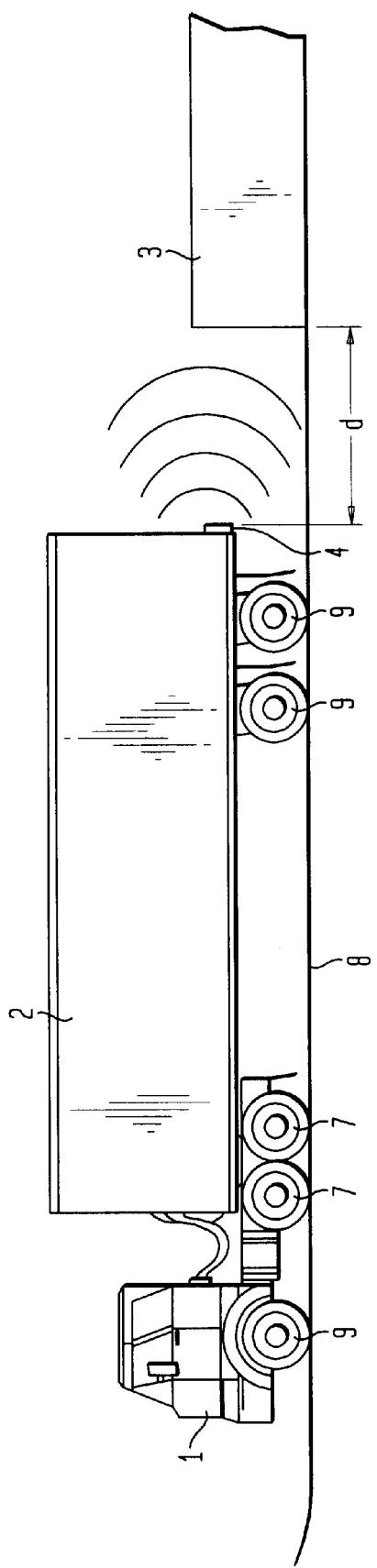
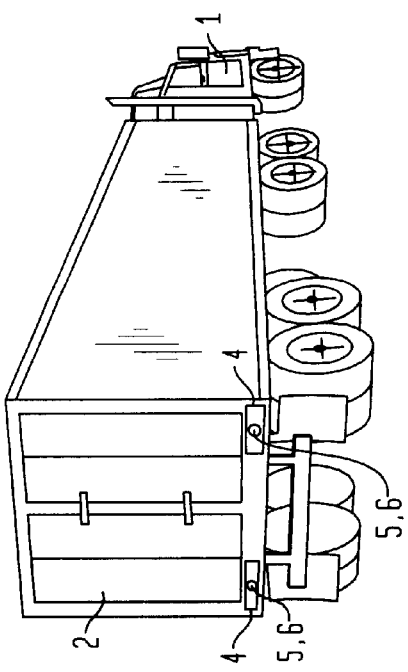
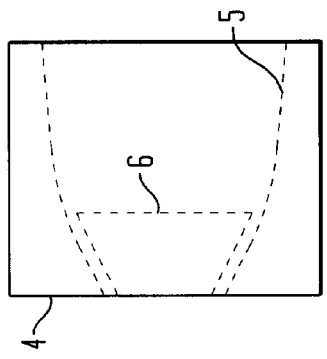

METHOD AND DEVICE FOR ASSISTING A DRIVER DURING REVERSE TRAVEL

BACKGROUND OF THE INVENTION

The present invention relates to a method and device for assisting a driver of a vehicle during reverse travel, and more particularly, to a method and device in which a distance between a vehicle tail and an obstacle is evaluated during travel of the vehicle in reverse towards the obstacle.

A device of this type is disclosed, for example, in DE 44 04 527 A1, incorporated herein by reference.

It is often necessary to drive vehicles, in particular trucks, trailers or semi-trailers, in reverse, towards an obstacle, for example, when parking or approaching a loading ramp. In such situations, it is generally desirable to achieve as close an approach as possible to the obstacle, without incurring an impact sufficient to cause damage to the vehicle and/or the obstacle. In the case of a truck which travels in reverse towards a loading ramp, it may furthermore be desirable to achieve contact between the loading surface of the truck and the loading ramp, in a manner in which damage to the truck and the loading ramp is effectively avoided.

The known device includes a distance sensor which ascertains the distance between the vehicle tail and an obstacle. In addition, a display device is provided within the driver's field of vision which displays the distance values determined by the distance sensor. The driver is then able to monitor the displayed distance values during reverse travel towards the obstacle.

In accordance with the known device, the driver decides upon an appropriate speed for approaching the obstacle and determines the correct moment for braking or stopping of the vehicle. An erroneous estimation on the part of the driver in the above decision making process may result in a relatively violent impact of the vehicle against the obstacle, possibly causing damage to the vehicle and/or to the obstacle.

It is therefore the object of the present invention to provide a method and a device which assists the driver of a vehicle during reverse travel, whereby damage to the vehicle and/or to the obstacle can be reliably avoided.

SUMMARY OF THE INVENTION

In accordance with these and other objects of the invention, there is provided a method of assisting a driver during reverse travel of a vehicle relative to an obstacle, in which a distance signal representative of a distance between the vehicle tail and the obstacle is evaluated. A speed of the vehicle is then automatically influenced as a function of the evaluated distance signal. A device is also provided for assisting the driver during reverse travel of a vehicle, which includes a distance sensor for emitting a distance signal representative of a distance between the vehicle tail and an obstacle, and an evaluating device for emitting evaluation signals based upon the distance signal received from the distance sensor. A mechanism is also included, in the form of, for example, a vehicle braking system or a vehicle engine control, for influencing a speed of the vehicle in response to the evaluation signals received from the evaluating device, operating in such manner that the speed of the vehicle is influenced automatically as a function of the distance signal.

The invention provides the advantage that the vehicle is automatically brought to a full stop independently of the actions of the driver, either shortly before reaching the obstacle, or upon light contact of the vehicle with the obstacle. The driver is thereby relieved of the responsibility of having to observe and correctly evaluate the distance values indicated on a display device, and is thus better able to concentrate on controlling the other operating parameters of the vehicle. This considerably facilitates operation by the driver during an approach of a vehicle to an obstacle during reverse travel, thus significantly reducing the incidence of damage and the resulting repair costs attendant therewith.

The invention provides the further advantage that safe operation of the vehicle by an inexperienced driver is effected without the requirement of special instructions, since the braking of the vehicle from any operating speed, even an inappropriately high speed of reverse travel, is fully automatic.

In order to determine the vehicle speed, any sensors which may already be present in the vehicle for the sensing of a speed information can be utilized. Thus, for example, signals received from sensors of an anti-lock braking system (ABS) which determine the rotational speeds of individual wheels, or a speed signal of the tachometer, can be used.

In an advantageous further development of the invention, the speed of the vehicle is determined from the change in the distance signal over time, for example, through numerical differentiation. In such manner, the process can also be economically implemented in vehicles not already equipped with speed sensors. When using additional speed signals from speed sensors of the above-mentioned type, a plausibility control of these signals can be carried out by comparison, so that an erroneous triggering of the process according to the invention can be reliably avoided.

In an advantageous embodiment of the invention, a device is provided which, in addition to utilizing a distance sensor and an evaluating device for the signals of the distance sensor, further includes means for influencing the speed of the vehicle. Such influence is implemented, for example, by an electric or electronic control of the vehicle engine and/or of the vehicle braking system. Particularly in connection with a vehicle train consisting of a towing vehicle and trailer or semi-trailer, the means for influencing the speed of the vehicle advantageously additionally comprise a data interface between the towing vehicle and the trailer or semi-trailer for transmission of control data for the drive engine and/or the braking system.

The above, and other objects, features and advantages of the present invention will become apparent from the following description read in conjunction with the accompanying drawings, in which like reference numerals designate the same elements and signals.

BRIEF DESCRIPTION OF THE FIGURES

FIG. 1 is a schematic side view of a vehicle train approaching a loading ramp in reverse travel;

FIG. 2 is a detailed view of a ramp bumper with a distance sensor contained therein;

FIG. 3 is a rear perspective view of the vehicle train of FIG. 1; and

DETAILED DESCRIPTION OF THE PREFERRED EMBODIMENT

Figure 4:
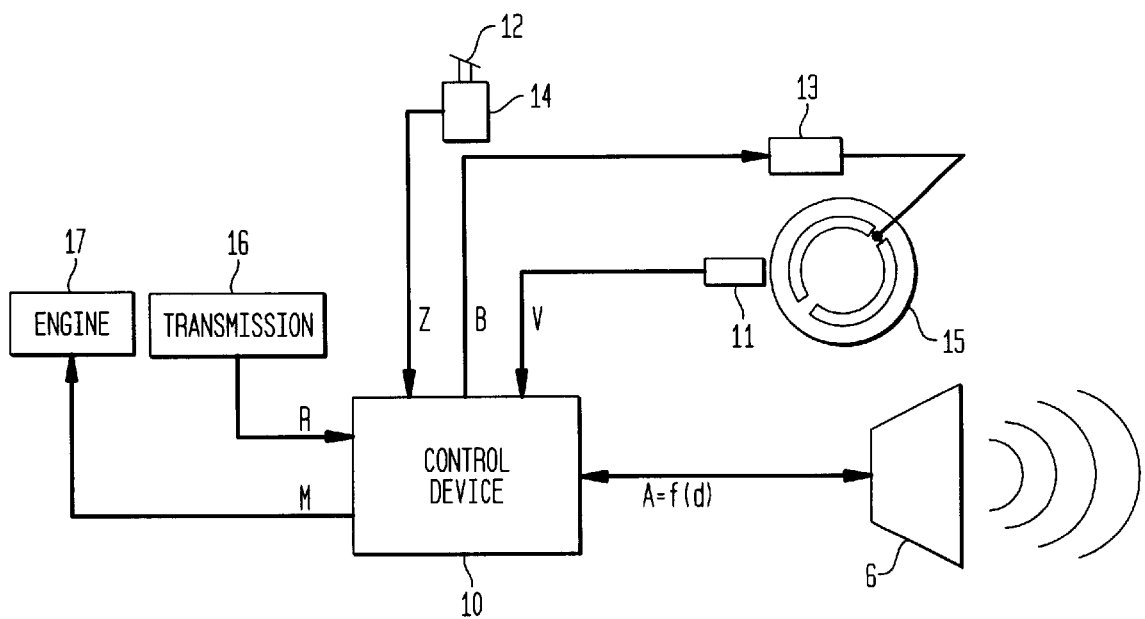
FIG. 4 is a schematic view of the components of the vehicle in which the invention is employed.

Referring now to the figures, and in particular FIG. 1, a vehicle, in which the method and device in accordance with the invention are to be utilized, is depicted. In the illustrative example, the vehicle is a vehicle train of known structure, and includes a semi-trailer towing vehicle 1 and a semi-trailer 2 coupled to the semi-trailer towing vehicle 1.

The semi-trailer towing vehicle 1 includes a drive engine which provides driving force, which is transmitted, via a transmission actuated by the driver of the vehicle, to drive wheels 7 of the semi-trailer towing vehicle 1, and thereby to the road surface 8 in contact therewith. The drive engine and transmission are conveniently of known construction, and are therefore not shown in FIG. 1.

The semi-trailer towing vehicle 1, as well as the semi-trailer 2, are each equipped with a braking system, by means of which a braking force can be exerted on the wheels 7, 9 of the semi-trailer towing vehicle 1 and on the wheels 9 of the semi-trailer 2 through actuation by the driver of a brake pedal installed in the semi-trailer towing vehicle 1.

In accordance with a preferred embodiment, the drive engine, as well as the braking system of each of the semi-trailer towing vehicle 1 and the semi-trailer 2, can be controlled by means of electrical signals. Such braking systems are generally referred to as "electrically controlled braking systems" or EBS. An example of such EBS is disclosed in EP 0 602 353 A1 (U.S. Pat. No. 5,419,621), which is incorporated herein by reference. When such a system is employed, at least one electronic control device is provided for control of the braking system. The electronic control device transmits brake actuation signals to the braking devices on the wheels 7, 9, the values of which are determined on the basis of braking command signals received from a brake signal transmitter actuated by the driver by operation of the brake pedal.

A sensor 11 is advantageously provided to determine a velocity signal V, as shown schematically in FIG. 4. It is also possible to use the vehicle's tachometer for this purpose. In a preferred embodiment, a sensor installed in proximity of a vehicle wheel is used to determine the rotational speed of the wheel, as is practiced in known anti-lock brake systems (ABS). The advantage of this approach is that the vehicle speed can be established very reliably and with high precision from the velocity signal V.

The vehicle according to FIG. 1 further includes two ram bumpers 4 installed on the tail of the semi-trailer 2, which are located respectively on the left and right vehicle sides under the loading surface edge. The placement of the ram bumpers 4 is also shown in FIG. 3. The ram bumpers 4 are preferably made of an elastic material, for example, rubber, and serve to protect the vehicle during reverse travel from damage caused by impact with an obstacle 3, for example, a loading ramp.

In addition to the structural characteristics described above, which are generally found in vehicle trains, two distance sensors 6 are provided. Distance sensors 6 are installed in the ram bumpers 4, oriented such that they do not protrude from the ram bumpers 4, in order to avoid damage thereto. The placement of the distance sensor 6 in the ram bumper 4 is shown in further detail in FIG. 2. The ram bumper 4 includes a recess 5 presenting a funnel-shaped interior which is oriented in the reverse traveling direction of the vehicle. The distance sensor 6 is installed within the recess 5, and is preferably provided in the form of an ultra-sound sensor. As such, the distance sensor 6 emits a sound signal, for example, upon being prompted by a control device, and transmits an acknowledgment signal to the control device upon receiving reflections of the emitted sound signal. The distance d between the distance sensor 6 and the obstacle 3 can then be inferred, in a known manner, from the time difference between the prompt for a sound emission and the transmission of the acknowledgment signal.

In a preferred embodiment of the invention, electronic circuitry is contained in the distance sensor, permitting evaluation of digital signals which are produced, in a simple manner.

The recess 5 preferably presents a contour which causes the emitted sound of the distance sensor 6 to be concentrated, for example, a parabolic or elliptic contour.

The various parts of the vehicle in accordance with the embodiment of FIGS. 1 and 2 which are relevant to the invention are shown in FIG. 4, in the form of a schematic diagram. For purposes of simplicity, only those components 11, 13, 15 assigned to one wheel are shown among the components of the braking system of the entire vehicle train located in proximity of the wheels. In practice, several or all wheels are respectively assigned their own components of the type shown. Also for the sake of simplification, only one of the two distance sensors 6 is shown.

An electronic control device 10 is equipped, in a known manner, with a microprocessor which executes a control program comprised of various control and regulating algorithms. Based upon the evaluation of various input signals A, V, Z, R, the control device 10 determines actuating signals M, B for the drive engine 17 or the braking system of the vehicle. The braking system is symbolically represented in FIG. 4 by a wheel brake 15 and a brake actuator 13 assigned to the wheel brake.

The wheel brake 15 is of a standard construction, provided, for example, in the form of a drum or disk brake, which is actuated mechanically by the brake actuator 13 via a braking rod system. The brake actuator 13 may be in the form of an electrically acting actuator, for example, an electric motor, or in the form of a positioning cylinder which can be subjected to a pressure medium, for example, compressed air, in combination with an electrically actuated valve. In the latter case, the vehicle is also provided with a pressure medium supply system of known construction, for example, a compressor.

The control device 10 carries out different control and regulating algorithms. One of these algorithms determines the brake actuating signal B as a function of a braking command signal Z which is emitted by a brake signal transmitter 14 actuated by the driver by means of a brake pedal 12, for purposes, for example, of ensuring low brake lining wear or obtaining a short braking distance. The brake actuating signal B is then transmitted to the brake actuator 13.

In a further development, the control device 10 includes another algorithm for assisting the driver during reverse travel in furtherance of the method according to the invention. For this purpose, a distance signal A, representing the distance d between the vehicle tail and the obstacle 3 and thereby a function of the distance (A=f(d)), as well as a reverse travel signal R emanating from the transmission 16, are processed in the control device. The reverse travel signal R is produced, for example, when the driver selects a reverse gear. The control device 10 generates the actuating signals M, B as a function of these input signals in such a manner that the speed of the vehicle is automatically influenced as a function of the distance signal A.

In general, when a driver of a vehicle wishes to approach a loading ramp in reverse travel, a reverse gear is selected, and the vehicle travels in reverse, approaching the loading ramp at more or less high speed. In a vehicle of the type shown in FIG. 1, i.e. a vehicle train consisting of a semi-trailer towing vehicle and semi-trailer, the driver's attention is directed primarily on keeping the vehicle train straight, i.e. to avoid a jack-knifing between semi-trailer towing vehicle and semi-trailer. For this purpose, the driver will look mainly in the direction of the vehicle tail, either directly or by using a rear-view mirror. Particularly with long transport trains, it is, however, often difficult for the driver to accurately evaluate the distance when approaching the loading ramp.

By utilizing the invention, the driver is assisted in the following described manner:

When the selection of the reverse gear is detected by the reverse travel signal R, the control device 10 monitors the distance signal A continuously.

For this purpose, the control device 10 emits a prompt to a distance sensor 6 calling for the emission of a sound signal and receives acknowledgement information from the distance sensor 6 upon the arrival of a sound reflection. From the time difference $\Delta t$ between the moment of the sound wave emission and the moment of receiving a sound reflection, the control device 10 determines a distance signal A' which represents the distance d, for example, according to the equation:

$$A'=K*\Delta t$$

where K is a constant, for example, K=333 m/s when A' is expressed in the unit m (meter) and $\Delta t$ in the unit s (seconds).

In a further development of the above-described basic determination process, a temperature compensation can additionally be provided to determine the distance signal A'.

The above-described process is applied to each distance sensor 6. The smaller value of the individual signals A' of the two distance sensors 6 is then continuously used as the resulting distance signal A.

The distance signal A is then classified in the control device 10 with respect to its value. In particular, the value range of the distance signal A is broken down into three zones as follows:

| | |
|---|---|
| Zone 1 | Distance signal A > 3 m |
| Zone 2 | Distance signal A between 1 m and 3 m |
| Zone 3 | Distance signal A < 1 m |

Furthermore a time derivative Å of the distance signal is continuously calculated. The velocity signal V is also concurrently evaluated. This permits either the velocity signal V or the time derivative Å of the distance signal to be used as the vehicle speed.

Depending on the zone of the value range found and the current vehicle speed V or Å, the control device 10 emits different actuating signals M, B. The driver can obtain stronger braking at any time by actuating the brake signal transmitter 14.

In the presence of a distance value in zone 1, i.e. with distance values of infinite magnitude, the driving force of the drive engine 17 is reduced and, if necessary, the brake actuator 13 is also actuated, preventing a predetermined first speed limit value V1 from being exceeded. In addition, the driver can, at such time, be alerted by means of an acoustic or optical signal.

When the zone 2 is reached, the vehicle is decelerated to a second predetermined speed limit value V2 which is less than the first speed limit value V1. The deceleration may occur, for example, after passage of a predetermined time period. It is also possible to vary the second speed limit value V2 as a function of the distance signal A, for example, following an exponential or hyperbolic function in order to achieve even, jolt-free braking.

When zone 3 is reached, the speed of the vehicle is further reduced in such manner that the vehicle is brought to a full stop shortly before contact with the loading ramp, for example, at a distance of 5 cm. This provides the advantage that damage due to vertical movements during loading and unloading of the vehicle are avoided. It is however also possible to allow the vehicle to move up against the loading ramp at a predetermined speed V3 having a selected value sufficiently low to prevent damage.

In a preferred embodiment of the invention, the determination of the vehicle speed is supported by the time derivative Å of the distance signal when the vehicle is in immediate proximity of the loading ramp, i.e. especially in zones 2 and 3. It is also possible, at such time, to exclusively use the time derivative Å of the distance signal as the vehicle speed.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. A method for assisting a driver during reverse travel of a vehicle towards an obstacle, comprising: upon activation of a reverse travel gear,
    evaluating distance signals representative of the distance between a vehicle tail of the vehicle and the obstacle;
    automatically influencing the speed of the vehicle as a function of the distance signals;
    assigning velocity values to the distance signals, said step of automatically influencing including limiting the speed of the vehicle so that it does not exceed the assigned velocity values;
    wherein the distance signals are classified into a plurality of zones with respect to their values; and
    wherein each of said zones is matched to a different assigned velocity value,
    wherein said zones comprise:
        zone 1, wherein the distance signals are greater than 3 m and the assigned velocity value for zone 1 is V1;
        zone 2, wherein the distance signals are between 1 m and 3 m and the assigned velocity value for zone 2 is V2;
        zone 3, wherein the distance signals are less than 1 m and the assigned velocity value for zone 3 is V3; and
        wherein V1 is greater than V2 which is greater than V3.

2. A method according to claim 1, wherein said step of automatically influencing includes automatically actuating a vehicle braking system of the vehicle.

3. A method according to claim 1, wherein said step of automatically influencing includes automatically controlling a drive engine of the vehicle.

4. A method according to claim 1, further comprising:
    automatically bringing the vehicle to a full stop when the distance signals drop below a predetermined value but before the vehicle tail comes into contact with the obstacle.

5. A method according to claim 1, wherein time derivatives of the distance signals are taken into account to influence the speed of the vehicle.

6. A method according to claim 1, wherein the speed of the vehicle is determined from time derivatives of the distance signals.

7. A method according to claim 1, wherein said step of automatically influencing is carried out only on condition that a reverse travel gear of the vehicle is engaged.

8. A method according to claim 1, wherein there are separate sets of distance signals representative of the distance from the left and right sides of the vehicle tail to the obstacle respectively, and wherein the speed of the vehicle is automatically influenced as a function of the smaller set of distance signals.

9. A method according to claim 1, further comprising:
allowing the vehicle tail to contact the obstacle at sufficiently low speed to prevent damage to the vehicle.

10. A method according to claim 1, wherein the distance signals are based upon temperature dependent signals and the distance signals are compensated for changes in ambient temperature.

11. A method according to claim 1, wherein the speed of the vehicle is automatically decreased after passage of a predetermined time period when zone 2 is reached.

12. A method according to claim 1, wherein assigned velocity value V2 is varied as a function of the distance signals.

13. A method according to claim 12, wherein the function is exponential.

14. A method according to claim 12, wherein the function is hyperbolic.

15. A device for assisting the driver of a vehicle during reverse travel of a vehicle towards an obstacle, comprising:
a distance sensor which emits distance signals representative of the distance between a vehicle tail of the vehicle and the obstacle;
a control device which receives said distance signals from said distance sensor and emits actuation signals based upon the distance signals;
a mechanism for influencing the speed of the vehicle in response to the actuation signals received from the control device such that the speed of the vehicle is influenced automatically as a function of the distance signals;
wherein upon activation of a reverse travel gear said control device assigns velocity values to the distance signals, said mechanism for influencing the speed of the vehicle limiting the speed of the vehicle so that it does not exceed the velocity values; and
wherein said control device classifies the distance signals into a plurality of zones with respect to their values; and
wherein each of said zones is matched to a different assigned velocity value,
wherein said control device classifies:
distance signals greater than 3 m into zone 1, which is assigned the velocity value V1;
distance signals between 1 m and 3 m into zone 2, which is assigned velocity value V2;
distance signals less than 1 m into zone 3, which is assigned velocity value V3; and
wherein V1 is greater than V2 which is greater than V3.

16. A device according to claim 15, wherein said mechanism includes a vehicle braking system.

17. A device according to claim 15, wherein said mechanism includes a vehicle engine control.

18. A device according to claim 15, wherein the distance sensor is located in an area defining a tail portion of the vehicle.

19. A device according to claim 15, wherein:
the vehicle includes an electrically controlled braking system (EBS), and
the control device is part of the EBS.

20. A device according to claim 15, wherein the distance sensor includes an ultra-sound sensor.

21. A device according to claim 15, wherein:
reverse travel signals are transmitted by a vehicle transmission to the control device when a reverse travel gear of the vehicle is engaged; and
the actuation signals of the control device are transmitted to the mechanism for influencing the speed of the vehicle only on condition that the control device receives said reverse travel signals.

22. A device according to claim 15, wherein the distance signals are based upon temperature dependent signals, and the control device compensates the distance signals for changes in ambient temperature.

23. A device according to claim 15, comprising first and second distance sensors mounted on the left and right sides of the vehicle which emit separate sets of distance signals representative of the distance from the left side of the vehicle tail and the right side of the vehicle tail to the obstacle respectively, and wherein said control device utilizes the smaller set of distance signals for assigning the velocity values.

24. A device according to claim 15, wherein said mechanism automatically decreases the speed of the vehicle after passage of a predetermined time period after zone 2 is reached.

25. A device according to claim 15, wherein said control device varies velocity value V2 as a function of the distance signals.

26. A device according to claim 16, wherein said control device varies velocity value V2 as an exponential function of the distance signals.

27. A device according to claim 16, wherein said control device varies velocity value V2 as a hyperbolic function of the distance signals.

28. A device according to claim 18, further comprising:
a ram bumper located in the area defining the tail portion of the vehicle, the ram bumper including a recess formed therein, the distance sensor being located in the recess of the ram bumper.

29. A device according to claim 20, wherein the ultra-sound sensor is a sound field modulated ultra-sound sensor.

30. A device according to claim 28, wherein the recess presents a contour which causes sound emitted by the distance sensor to be concentrated.

31. A device according to claim 30, wherein the contour is parabolic.

32. A device according to claim 30, wherein the contour is elliptic.

33. A device for assisting the driver of a vehicle during reverse travel, comprising:
a distance sensor which emits a distance signal representative of a distance between the vehicle tail and an obstacle;
an evaluating device which emits evaluation signals based upon the distance signal received from the distance sensor; and
a mechanism for influencing a speed of the vehicle in response to the evaluation signals received from the evaluating device in such manner that the speed of the vehicle is influenced automatically as a function of the distance signal;

wherein when the distance between the vehicle and the obstacle is great, the speed of the vehicle is determined from a signal produced by a rotational speed sensor which monitors the rotational speed of a wheel of the vehicle; and wherein when the vehicle is in the immediate proximity of the obstacle, the speed of the vehicle is determined from the rate of change of the distance signal with respect to time.

34. A device according to claim 33, wherein said mechanism includes a vehicle braking system.

35. A device according to claim 33, wherein said mechanism includes a vehicle engine control.

36. A device according to claim 33, wherein the distance sensor is located in an area defining a tail portion of the vehicle.

37. A device according to claim 33, further comprising a ram bumper located in an area defining the tail portion of the vehicle, the ram bumper including a recess formed therein, the distance sensor being located in the recess of the ram bumper.

38. A device according to claim 33, wherein the vehicle includes an electrically controlled braking system (EBS), and the evaluation device is part of the EBS.

39. A device according to claim 33, wherein the distance sensor includes an ultrasound sensor.

40. A device according to claim 33, wherein a reverse travel signal is transmitted by a vehicle transmission to the evaluation device when a reverse travel gear is selected, and the evaluation signals of the evaluation device are transmitted to the mechanism for influencing the speed of the vehicle only on condition that the reverse travel signal occurs.

41. A device according to claim 33, wherein the speed of the vehicle is determined from the signal produced by the rotational speed sensor when the distance between the vehicle and the obstacle is greater than about 3 m, and wherein the speed of the vehicle is determined from the rate of change of the distance signal with respect to time when the distance between the vehicle and the obstacle is about 3 m or less.

* * * * *